United States Patent
Sakakibara et al.

(10) Patent No.: US 7,540,531 B2
(45) Date of Patent: Jun. 2, 2009

(54) VEHICLE AIRBAG SYSTEM

(75) Inventors: Kimio Sakakibara, Nishio (JP);
Kazuhiro Kawachi, Nishikamo-gun (JP); Makoto Sekizuka, Toyota (JP); Osamu Fukawatase, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 435 days.

(21) Appl. No.: 11/437,976

(22) Filed: May 22, 2006

(65) Prior Publication Data
US 2006/0284400 A1   Dec. 21, 2006

(30) Foreign Application Priority Data
Jun. 16, 2005   (JP)   ............... 2005-176123

(51) Int. Cl.
*B60R 21/20*   (2006.01)
(52) U.S. Cl. .................. 280/732; 280/728.3
(58) Field of Classification Search .............. 280/728.3, 280/732
See application file for complete search history.

(56) References Cited

U.S. PATENT DOCUMENTS

| | | | | |
|---|---|---|---|---|
| 4,911,471 A | * | 3/1990 | Hirabayashi ................. | 280/732 |
| 4,951,963 A | | 8/1990 | Behr et al. | |
| 5,135,253 A | | 8/1992 | Hirashima et al. | |
| 5,303,042 A | * | 4/1994 | Lewis et al. .............. | 348/14.01 |
| 5,344,184 A | | 9/1994 | Keeler et al. | |
| 5,385,366 A | * | 1/1995 | Frank et al. ............... | 280/728.3 |
| 5,536,043 A | * | 7/1996 | Lang et al. .................. | 280/753 |
| 5,556,126 A | * | 9/1996 | Lee .......... | 280/728.3 |
| 5,904,367 A | * | 5/1999 | Warnez et al. ........... | 280/728.3 |
| 6,024,377 A | | 2/2000 | Lane, Jr. | |
| 6,364,345 B1 | * | 4/2002 | Lang ....................... | 280/728.3 |
| 6,422,592 B2 | * | 7/2002 | Reiter et al. ............. | 280/728.3 |
| 6,464,255 B1 | * | 10/2002 | Preisler et al. ............. | 280/752 |
| 6,929,281 B2 | * | 8/2005 | Loeper et al. ........... | 280/728.3 |
| 2005/0057022 A1 | | 3/2005 | Birk et al. | |
| 2005/0248131 A1 | | 11/2005 | Mori et al. | |

FOREIGN PATENT DOCUMENTS

| | | |
|---|---|---|
| DE | 103 16 543 A1 | 11/2003 |
| JP | B2-06-002456 | 1/1994 |
| JP | A-06-127328 | 5/1994 |
| JP | B2-3198874 | 6/2001 |
| JP | A-2004-203226 | 7/2004 |
| JP | A-2004-352037 | 12/2004 |
| JP | B2-3622599 | 12/2004 |

* cited by examiner

*Primary Examiner*—Ruth Ilan
(74) *Attorney, Agent, or Firm*—Oliff & Berridge, PLC

(57) ABSTRACT

A vehicle airbag system includes a vehicle crash sensor that detects a vehicle impact, and an airbag module that is provided in interior equipment positioned in front of a front-seat occupant and that includes an inflator and an airbag. The vehicle airbag system further includes a reaction-force plate that receives a reaction force of the airbag; a drive unit that moves the reaction-force plate from the storage position to the predetermined operating position; and a stopper that holds the reaction-force plate at the predetermined operating position. In the airbag system, when the airbag is deployed, the reaction-force plate is moved from the storage position to the predetermined operating position by the drive unit.

19 Claims, 20 Drawing Sheets

F I G .20
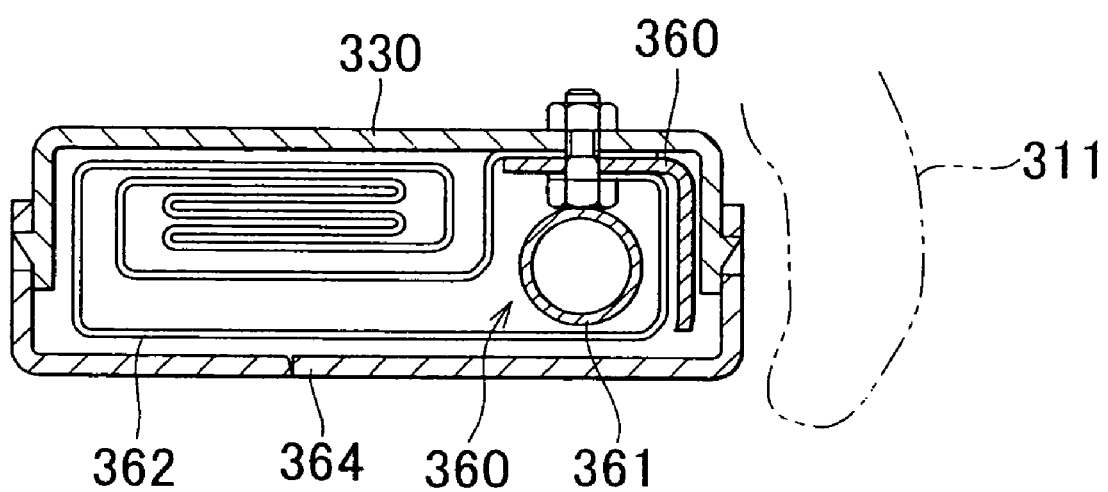

VEHICLE AIRBAG SYSTEM

INCORPORATION BY REFERENCE

The disclosure of Japanese Patent Application No. 2005-176123 filed on Jun. 16, 2005 including the specification, drawings and abstract is incorporated herein by reference in its entirety.

BACKGROUND OF THE INVENTION

1. Field of the Invention

The invention generally relates to a vehicle airbag system. More specifically, the invention relates to a vehicle airbag system provided with a vehicle crash sensor that detects a vehicle impact, and an airbag module that is provided in interior equipment positioned in front of a front-seat occupant and that includes an inflator and an airbag. The airbag is deployed by actuating the inflator when the vehicle crash sensor detects a vehicle impact, in order to protect the front-seat occupant.

2. Description of the Related Art

Such an airbag system is described in, for example, Japanese Patent Application Publication No. JP-A-2004-203226. The vehicle airbag system described in this publication includes an upper-body airbag and a knee airbag for a front-seat occupant. The upper-body airbag is provided in an upper portion of an instrument panel, and the knee airbag is provided in a lower portion of the instrument panel.

In a vehicle described in Japanese Patent Application Publication No. JP-A-2004-203226, the vertical size of the instrument panel is large. Accordingly, the upper portion of the instrument panel is close to a windshield, and the lower portion of the instrument panel is close to the knees of the front-seat occupant. Accordingly, the upper-body airbag appropriately is deployed using the upper portion of the instrument panel and the windshield as reaction-force members, and the knee airbag is appropriately deployed using the lower portion of the instrument panel as a reaction-force member.

However, when a thin (vertically small-sized) instrument panel or a moderately raked windshield is employed, an upper-body airbag, a knee airbag, etc. having large bag capacities and a larger inflator need to employed, resulting in a need for a larger airbag module that can house these large inflator and airbags. In these cases, members (the windshield or the instrument panel) that support the deployed airbag are distant from the position where the airbag module are provided, which makes it difficult to obtain a reaction force.

SUMMARY OF THE INVENTION

A first aspect of the invention relates to a vehicle airbag system including a vehicle crash sensor that detects a vehicle impact; and an airbag module that is provided in interior equipment positioned in front of a front-seat occupant, and that includes an inflator and an airbag. In the vehicle airbag system, when the vehicle crash sensor detects a vehicle impact, the airbag is deployed by activating the inflator in order to protect the front-seat occupant. According to the first aspect, the vehicle airbag system further includes a reaction-force plate that receives a reaction force of the airbag; a moving device that moves the reaction-force plate from a storage position to a predetermined operating position; and a holding device that holds the reaction-force plate at the predetermined operating position. When the airbag is deployed, the reaction-force plate can be moved from the storage position to the predetermined operating position by the moving device.

In the vehicle airbag system, when the airbag is deployed, the reaction-force plate can be moved from the storage position to the predetermined operating position, and the reaction force is held at the predetermined operating position by the holding device. Accordingly, even when a thin (vertically small-sized) instrument panel is employed or a moderately raked windshield is employed, it is possible to appropriately set the predetermined operating position to which the reaction-force plate is moved and at which the reaction-force plate is held by the holding device.

Thus, in the vehicle airbag system, an upper-body airbag, a knee airbag, etc. having smaller bag capacities, for the front-seat occupant and a smaller-sized inflator can be employed. In the vehicle airbag system, because the reaction-force plate supports the deployed airbag at the predetermined operating position, a reaction force of the deployed airbag can be obtained more easily.

A second aspect of the invention relates to a vehicle airbag system including a vehicle crash sensor that detects a vehicle impact; and an airbag module that is provided in interior equipment positioned in front of a front-seat occupant, and that includes an inflator and an airbag. In the vehicle airbag system, when the vehicle crash sensor detects a vehicle impact, the airbag is deployed by activating the inflator in order to protect the front-seat occupant. According to the second aspect, the vehicle airbag system further includes an active reaction-force plate that receives a reaction force of the airbag; an actuator that can move the active reaction-force plate from a storage position to a predetermined operating position; and a holding device that holds the active reaction-force plate at the predetermined operating position. Before the airbag is deployed, the active reaction-force plate can be moved from the storage position to the predetermined operating position by the actuator.

In the vehicle airbag system, before the airbag is deployed, the active reaction-force plate can be moved from the storage position to the predetermined operating position by the actuator. Accordingly, the airbag can be appropriately deployed, and the front-seat occupant can be reliably protected. Also, the active reaction-force plate can be moved to a given position or returned to the storage position by the actuator.

BRIEF DESCRIPTION OF THE DRAWINGS

FIG. 20 illustrates the schematic cross-sectional side view of the inner structure of an airbag module of the vehicle airbag system in FIG. 19;

DETAILED DESCRIPTION OF THE PREFERRED EMBODIMENTS

Figure 1:
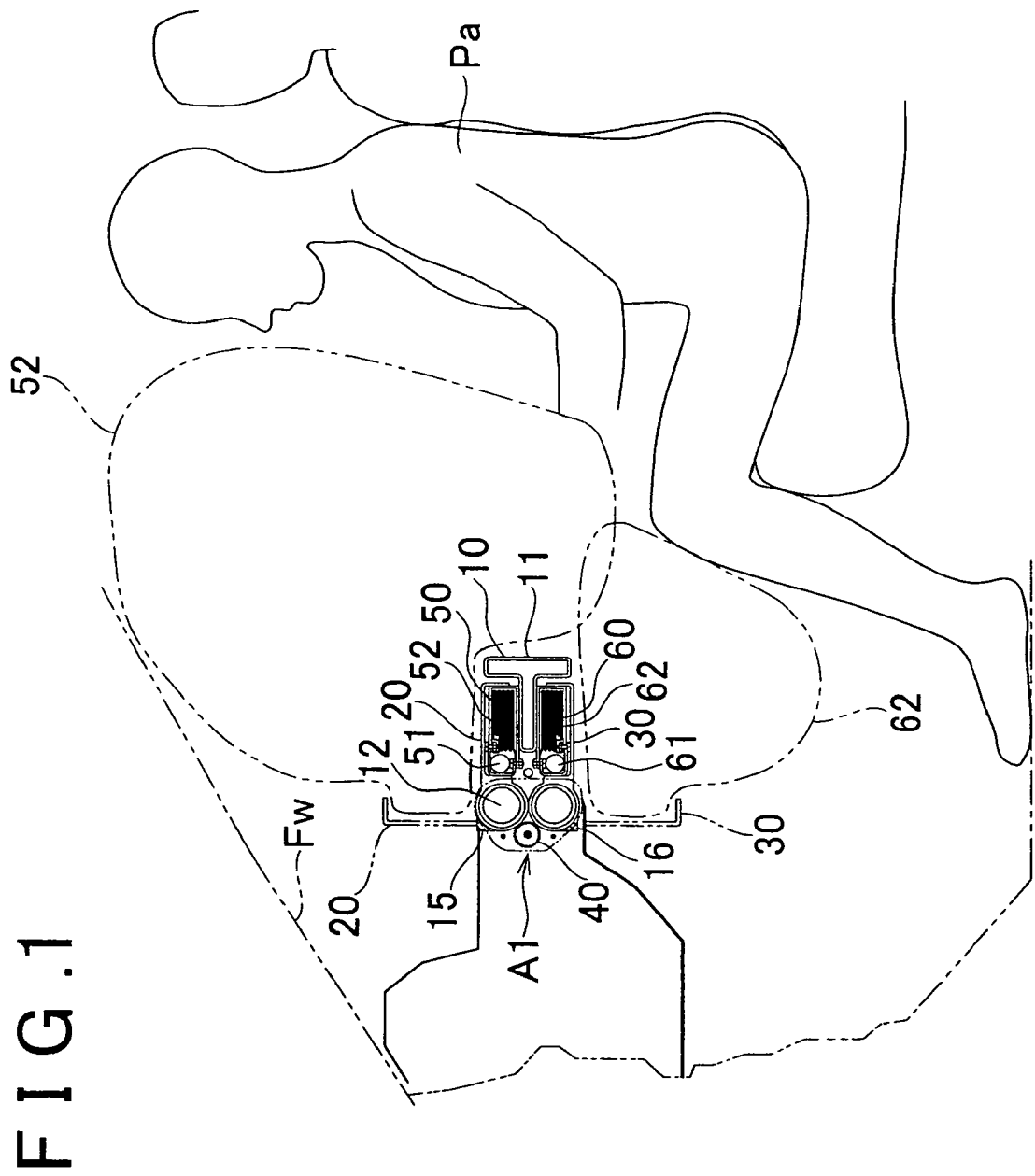
FIG. 1 illustrates the schematic vertical cross-sectional side view of a vehicle airbag system according to a first embodiment of the invention.

Hereafter, embodiments of the invention will be described with reference to accompanying drawings. FIGS. 1 to 12 illustrate a vehicle airbag system according to a first embodiment of the invention. A vehicle airbag system A1 according to the first embodiment includes a vehicle crash sensor S1 (see FIG. 12) that detects a vehicle impact; two reaction-force plates 20 and 30 positioned one above the other, which are provided in interior equipment 10 in front of a front-seat occupant Pa; a drive unit 40 provided in the interior equipment 10; an upper-body airbag module 50 fitted to the upper reaction-force plate 20; and a knee airbag module 60 fitted to the lower reaction-force plate 30.

The interior equipment includes a thin instrument panel 11 that has a T-shaped cross section and that is vertically small-sized; and an instrument panel reinforcement 12 that supports the instrument panel 11. The interior equipment further includes a left support bracket 13 and a right support bracket 14 (see FIGS. 2, 3, and 6 to 9) that support the reaction-force plates 20 and 30 such that the reaction-force plates 20 and 30 can pivot vertically but cannot move in the lateral direction; and stoppers 15 and 16 (see FIGS. 1 and 10) that serve as holding means for holding the reaction-force plates 20 and 30 at predetermined operating positions (uprising positions).

The front face of the instrument panel 11 faces the front-seat occupant and is a functional surface that configures the design thereof. The instrument panel 11 has a partition wall 11a at the center portion of the rear face, which faces away from the front-seat occupant. The partition wall 11a horizontally extends, and serves as a partition between the reaction-force plates 20 and 30. The instrument panel reinforcement 12 is provided behind the instrument panel 11 such that the instrument panel reinforcement 12 is closer to the front of the vehicle than the instrument panel 11 is. The instrument panel reinforcement 12 is held and supported by a vehicle body (not shown) at the right and left end portions. The instrument panel reinforcement 12 supports the instrument panel 11 via support brackets (not shown).

Figure 2:
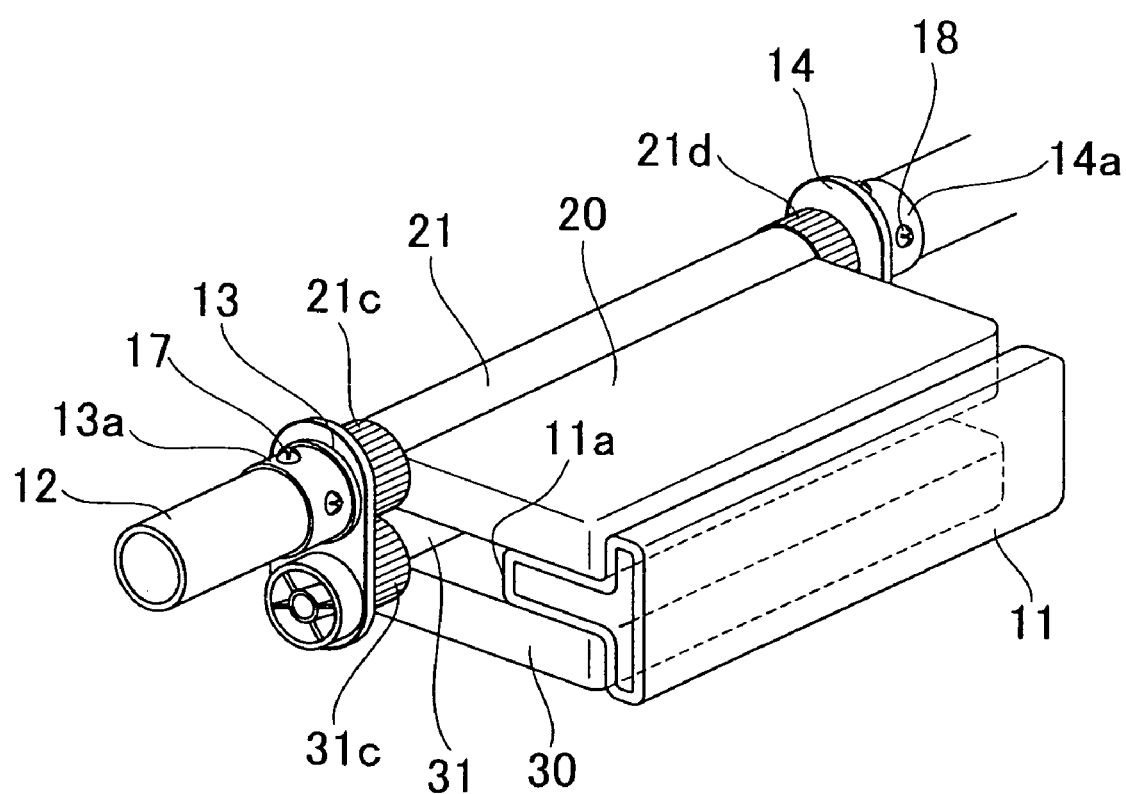
FIG. 2 illustrates the enlarged perspective view of the main portion of the vehicle airbag system in FIG. 1.
Figure 3:
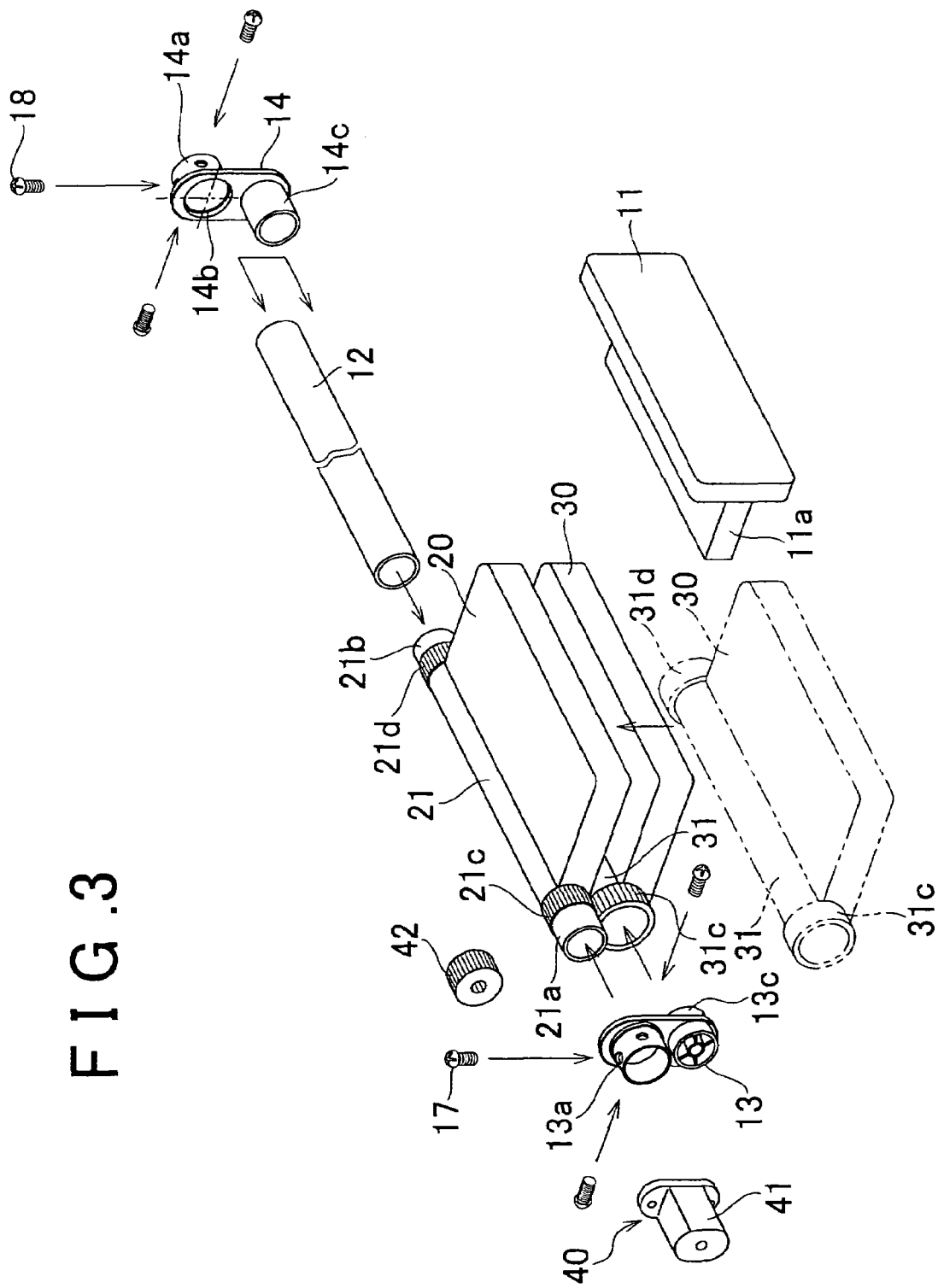
FIG. 3 illustrates the exploded perspective view of the main portion of the vehicle airbag system in FIG. 2.
Figure 4:
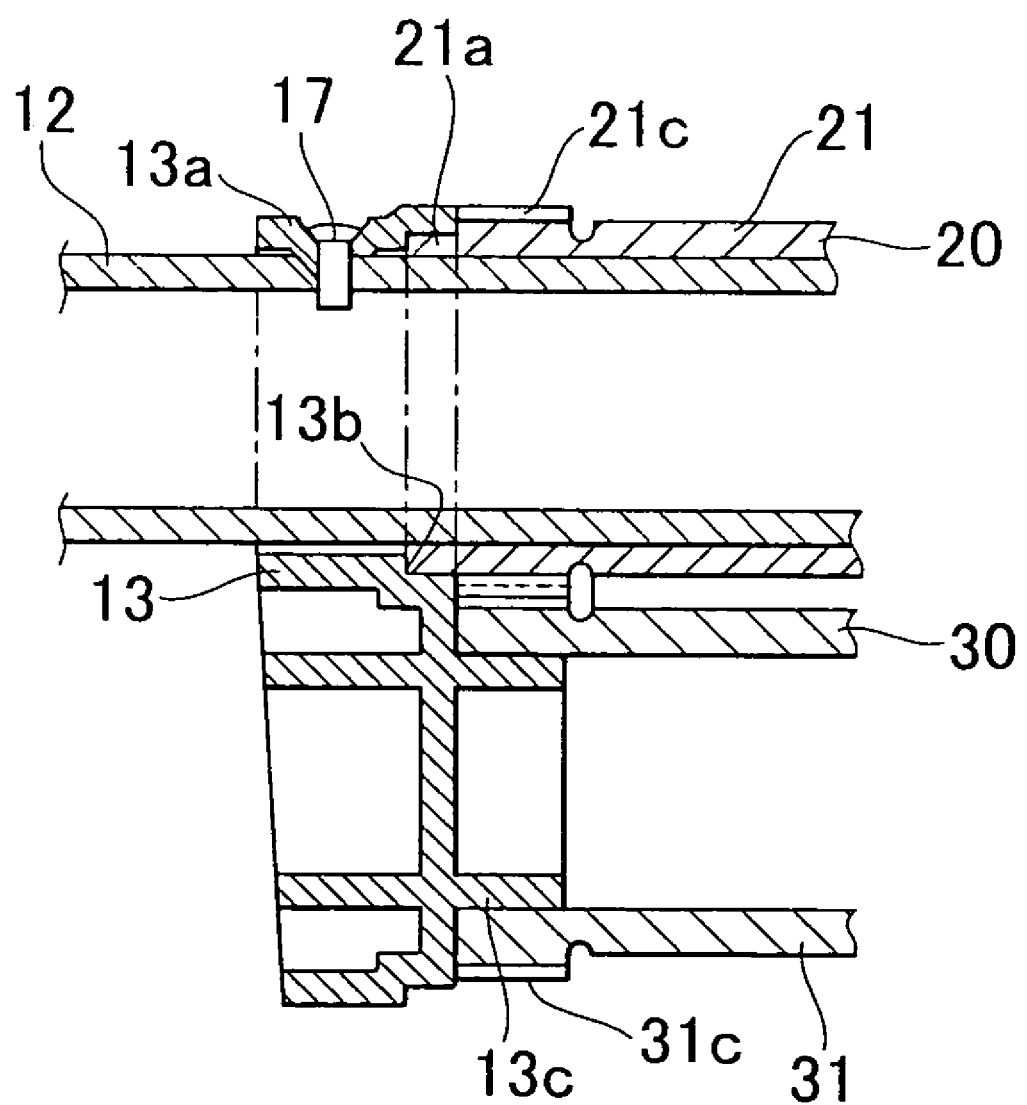
FIG. 4 illustrates the cross-sectional view showing the relationship among an instrument panel reinforcement, a left support bracket, and two reaction-force plates, one of which is positioned above the other, of the vehicle airbag system in FIG. 2.
Figure 5:
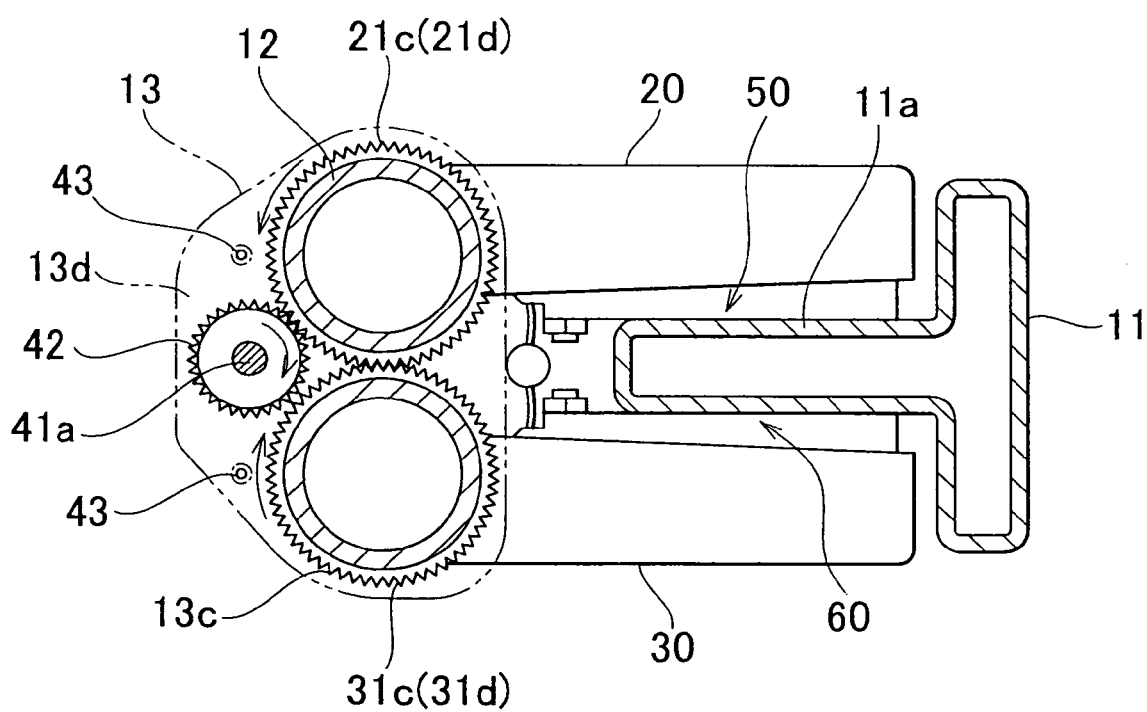
FIG. 5 illustrates the vertical cross-sectional side view of a left gear mesh portion of the vehicle airbag system in FIG. 2.
Figure 6:
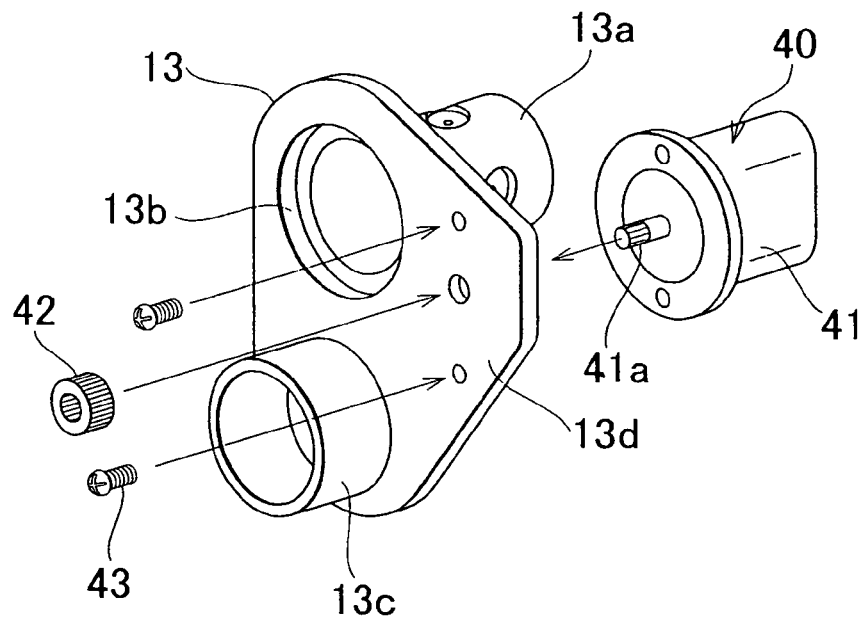
FIG. 6 illustrates the exploded perspective view of the left support bracket and an electric motor of the vehicle airbag system in FIG. 2, viewed from one side.
Figure 7:
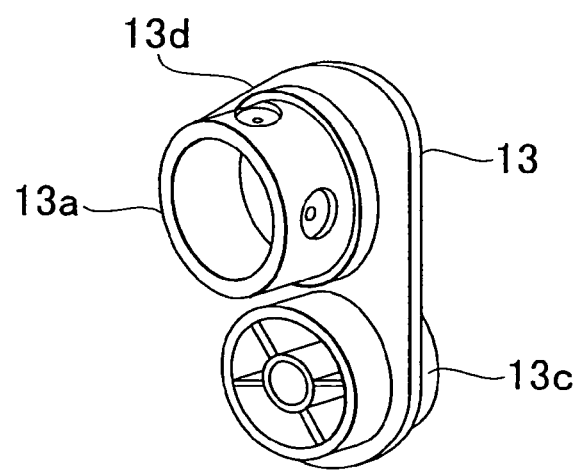
FIG. 7 illustrates the perspective view of the left support bracket in FIG. 6, viewed from the other side.

As shown in FIGS. 2 to 4, the left support bracket 13 is fitted integrally to the instrument panel reinforcement 12 using three screws 17. As shown in FIGS. 5 to 7, the left support bracket 13 has a fitting cylindrical portion 13a, a stepped inner hole 13b, a support cylindrical portion 13c, and a flange portion 13d. The left support bracket 13 is fitted to the bumper reinforcement 12 at the fitting cylindrical portion 13a.

Figure 8:
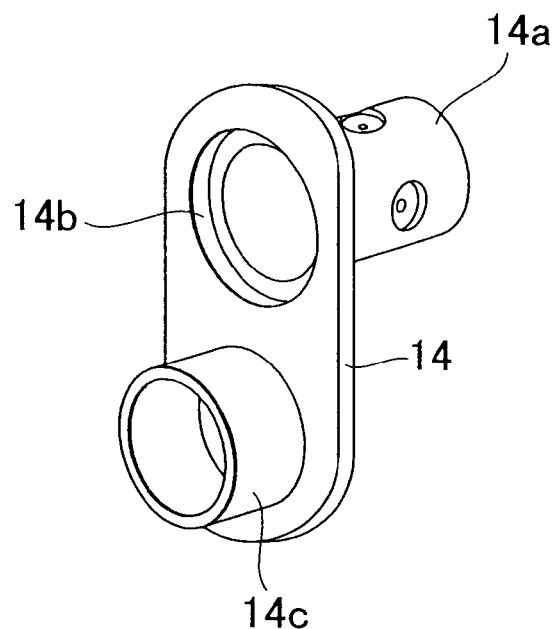
FIG. 8 illustrates the perspective view of a right support bracket of the vehicle airbag system in FIG. 2, viewed from one side.
Figure 9:
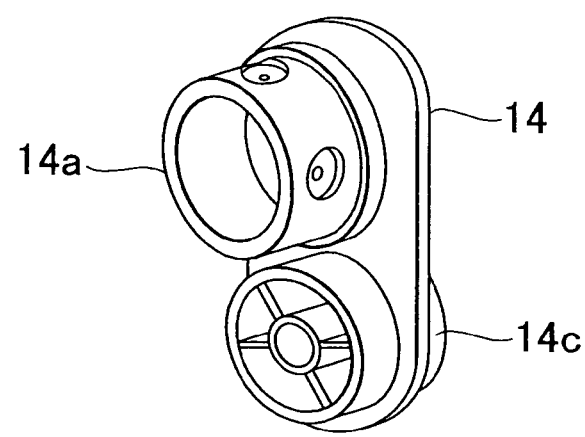
FIG. 9 illustrates the perspective view of the right support bracket in FIG. 8, viewed from the other side.

As shown in FIGS. 2 and 3, the right support bracket 14 is fitted integrally to the instrument penal reinforcement 12 using three screws 18. As shown in FIGS. 8 and 9, the right support bracket 14 has a fitting cylindrical portion 14a, a stepped inner hole 14b, and a support cylindrical portion 14c. The right support bracket 14 is fitted to the instrument panel reinforcement 12 at the fitting cylindrical portion 14a.

The upper reaction-force plate 20 is an active reaction-force plate that is driven by the drive unit 40, and can house the upper-body airbag module 50. A cylindrical portion 21 is formed at the end of the reaction-force plate 20. As shown in FIGS. 2 to 4, the cylindrical portion 21 is provided around the instrument panel reinforcement 12 such that the upper reaction-force plate 20 can pivot vertically. A left shaft-support portion 21a and a right shaft-support portion 21b, and a left gear 21c and a right gear 21d are provided around the left end portion and the right end portion of the cylindrical portion 21, respectively.

As shown in FIGS. 3 and 4, the left shaft-support portion 21a is fitted in the stepped inner hole 13b of the left support bracket 13 such that the shaft-support portion 21a can rotate but cannot move leftwards. As shown in FIGS. 2 and 3, the right shaft-support portion 21b is fitted in the stepped inner hole 14b of the right support bracket 14 such that the shaft-support portion 21b can rotate but cannot move rightwards.

The lower reaction-force plate 30 is an active reaction-force plate that is driven by the drive unit 40 via the gear 21c of the upper reaction-force plate 20, and can house the knee airbag module 60. A cylindrical portion 31 is formed at the end of the reaction-force plate 30. As shown in FIGS. 2 to 4, the cylindrical portion 31 is fitted around the support cylindrical portions 13c and 14c of the left support bracket 13 and the right support bracket 14 such that the lower reaction-force plate 30 can pivot vertically. A left gear 31c and a right gear 31*d* (see the portion indicated by the two-dotted lines in FIG. 3) are provided around the left end portion and the right end portion of the cylindrical portion 31, respectively.

As shown in FIG. 5, the left gear 31*c* at the lower reaction-force plate 30 meshes with the left gear 21*c* at the upper reaction-force plate 20. The right gear 31*d* at the lower reaction-force plate 30 meshes with the right gear 21*d* at the upper reaction-force plate 20. With this structure, the upper reaction-force plate 20 and the lower reaction-force plate 30 are connected to each other via linkage means including the gears 21*c* and 31*c* and the gears 21*d* and 31*d*. As the upper reaction-force plate 20 moves (pivots) upward, the lower reaction-force plate 30 can move downward.

The drive unit 40 includes an electric motor 41 and a drive gear 42. The electric motor 41 is an actuator serving as moving means for moving the reaction-force plates 20 and 30 from the storage positions indicated by the solid lines in FIG. 1 to the predetermined operating positions indicated by the two-dotted lines in FIG. 1. The electric motor 41 is fitted to the flange portion 13*d* of the left support bracket 13 using two screws 43 (see FIGS. 5 and 6). The electric motor 41 is controlled by an electric control unit (ECU) in accordance with the detection signals from the vehicle crash sensor S1. As shown in FIG. 5, the drive gear 42 is fitted around an output shaft 42*a* of the electric motor 41 such that the drive gear 42 can rotate together with the output shaft 41*a*. The drive gear 42 meshes with the left gear 21*c* at the upper reaction-force plate 20, and can transmit output of the electric motor 41 to the gear 21*c*.

Figure 10:
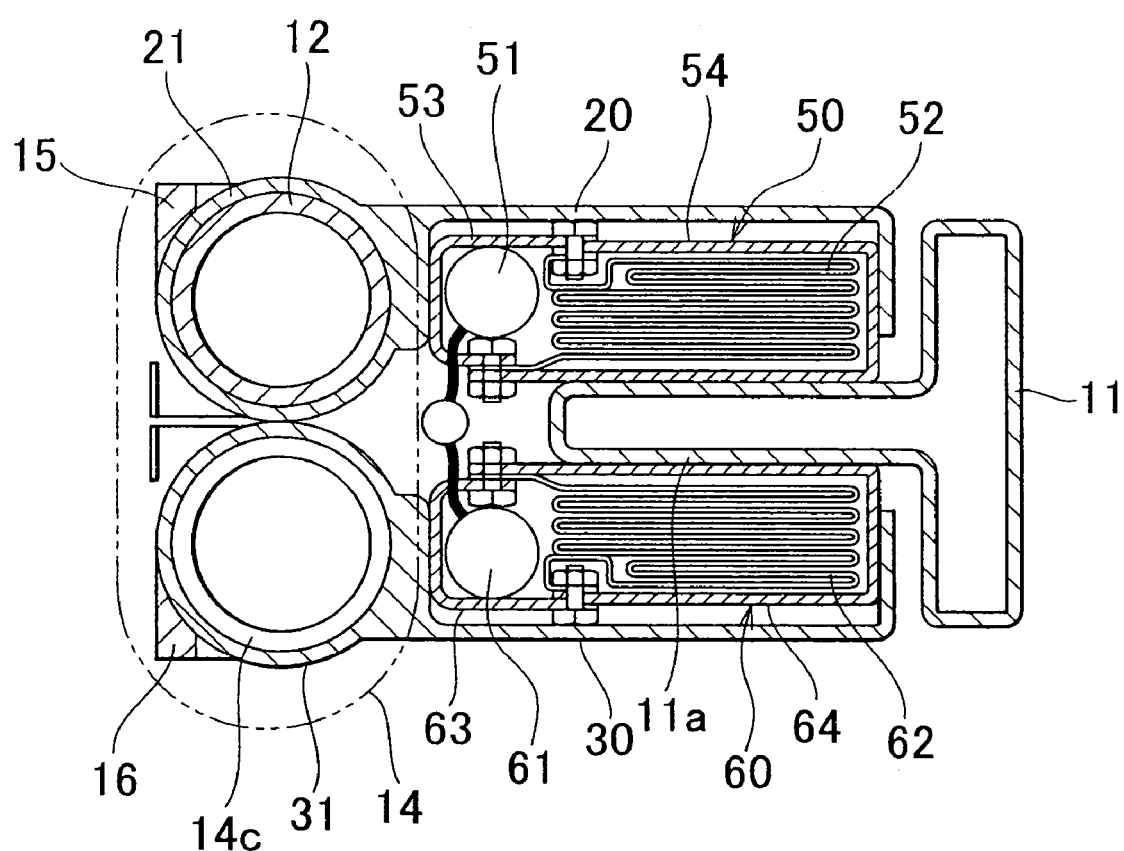
FIG. 10 illustrates the schematic vertical cross-sectional side view of the inner structure of both airbag modules of the vehicle airbag system in FIG. 2.
Figure 11:
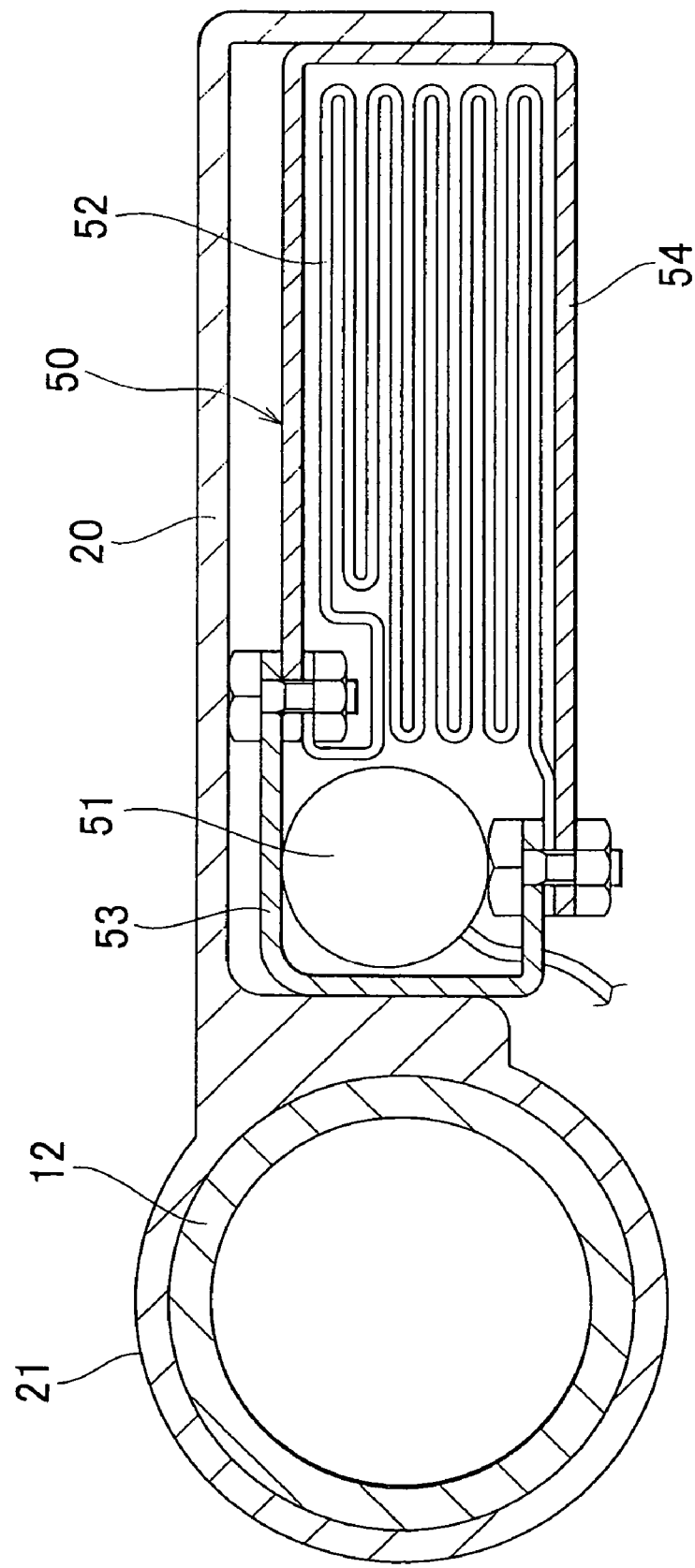
FIG. 11 illustrates the enlarged cross-sectional view of the inner structure of the upper airbag module in FIG. 10.

As shown in FIGS. 10 and 11, the upper-body airbag module 50 includes an inflator 51 and an upper-body airbag 52, and is fitted to the upper reaction-force plate 20 via a holder 53. The inflator 51 is a known inflator that injects gas into the upper-body airbag 52. The inflator 51 is controlled by the electric control unit ECU in accordance with the signal output from the vehicle crash sensor S1.

The upper-body airbag 52 is a known airbag that is deployed, as indicated by the two-dotted line in FIG. 1, using the gas injected from the inflator 51. The upper-body airbag 52 is housed inside of the upper reaction-force plate 20 when folded. As shown in FIGS. 10 and 11, the folded upper-body airbag 52 is covered and protected by a cover 54 that ruptures due to deployment of the upper-body airbag 52.

As shown in FIG. 10, the knee airbag module 60 includes an inflator 61 and a knee airbag 62. The knee airbag module 60 is fitted to the lower reaction-force plate 30 via a holder 63. The inflator 61 is a known inflator that injects gas into the knee airbag 62. The inflator 61 is controlled by the electric control unit ECU in accordance with the signal output from the vehicle crash sensor S1.

The knee airbag 62 is a known airbag that is deployed, as indicated by the two-dotted line in FIG. 1, using the gas injected from the inflator 61. The knee airbag 62 is housed inside of the lower reaction-force plate 30 when folded. As shown in FIG. 10, the folded knee airbag 62 is covered and protected by a cover 64 that ruptures due to deployment of the airbag 62.

Figure 12:
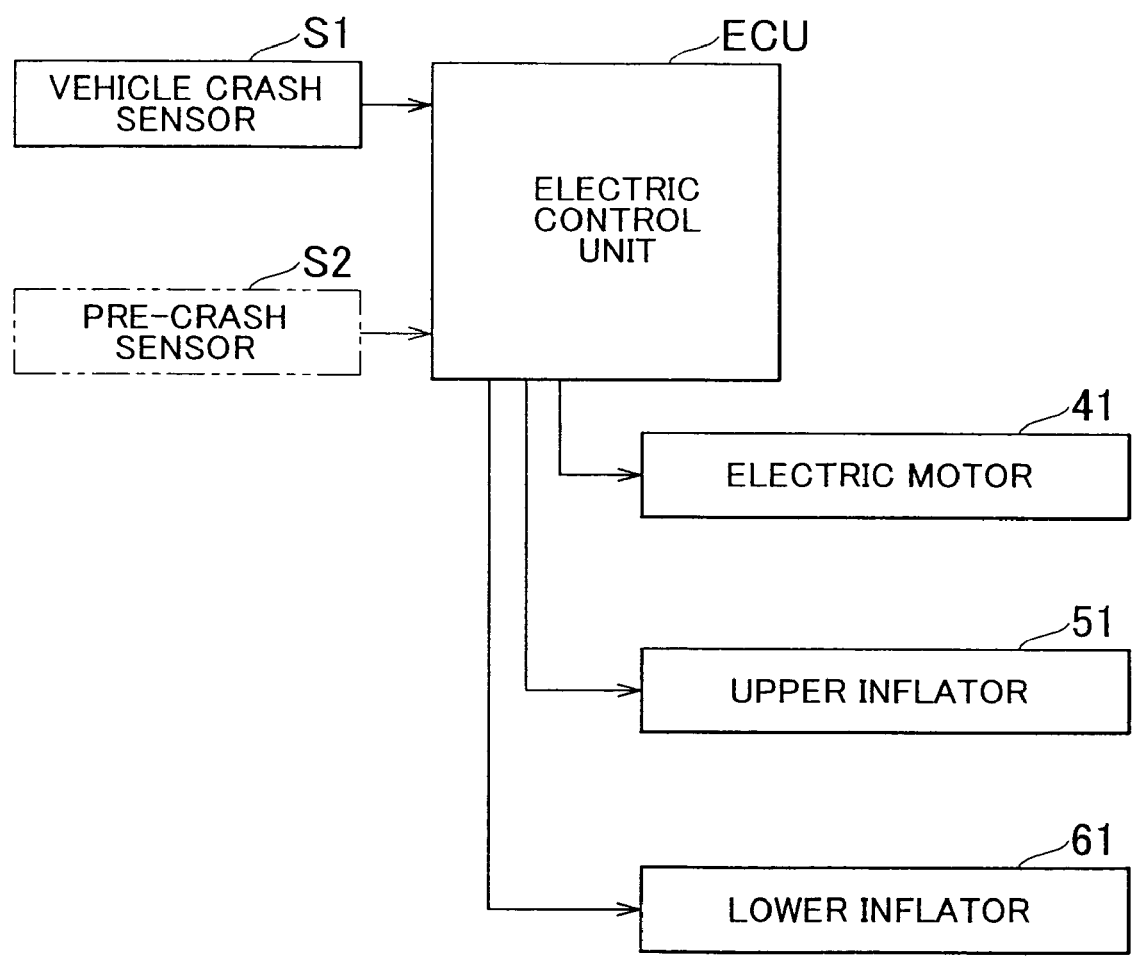
FIG. 12 schematically illustrates an electric circuit in the first embodiment shown in FIGS. 1 to 11.

As shown in FIG. 12, the electric control unit ECU is connected to the vehicle crash sensor S1, the electric motor 41, and the inflators 51 and 61. The electric control unit ECU is configured to supply electric power to the electric motor 41 such that the electric motor 41 rotates in the positive direction for a predetermined time before the electric power supply to the inflators 51 and 61, in accordance with the signal output from the vehicle crash sensor S1, when the vehicle crash sensor S1 detects a vehicle impact. Thus, when a vehicle impact is detected, the reaction-force plates 20 and 30 can be moved, in advance, from the storage positions to the predetermined operating positions due to the positive rotation of the electric motor 41 before deployment of the airbags 52 and 62.

In the vehicle airbag system A1 thus configured according to the first embodiment, the reaction-force plates 20 and 30 can be moved, in advance, from the storage positions to the predetermined operating positions due to the positive rotation of the electric motor 41 before deployment of the airbags 52 and 62. The reaction-force plates 20 and 30 that have moved to the predetermined operating positions are held there by the stoppers 15 and 16, respectively. Accordingly, the airbags 52 and 62 can be appropriately deployed as indicated by the two-dotted lines in FIG. 1, which makes it possible to reliably protect the front-seat occupant Pa.

In the vehicle airbag system A1, even if the thin (vertically small-sized) instrument panel 11 is employed or a moderately raked windshield FW is employed, it is possible to appropriately set the operating positions of the reaction-force plates 20 and 30, at which the reaction-force plates 20 and 30 are held by the stoppers 15 and 16 (the predetermined operating positions to which the reaction-force plates 20 and 30 are moved by the electric motor 41 and at which they are held by the stoppers 15 and 16, respectively) by appropriately setting the positions of the stoppers 15 and 16, respectively.

Thus, in the vehicle airbag system A1, the upper-body airbag 52, the knee airbag 62, etc., having smaller bag capacities, for the front-seat occupant Pa and the smaller-sized inflators 51 and 61 can be employed. In addition, in the vehicle airbag system A1, because the reaction-force plates 20 and 30 support the deployed airbags 52 and 62 at the predetermined operating positions, respectively, the reaction force of the deployed airbags 52 and 62 can be obtained more easily.

In the vehicle airbag system A1, the upper reaction-force plate 20 and the lower reaction-force plate 30 are connected to each other via the linkage means including the gears 21*c* and 31*c* and the gears 21*d* and 31*d*, and the lower reaction-force plate 30 can move downward as the upper reaction-force plate 20 moves upward. Accordingly, both the reaction-force plates 20 and 30 can be moved from the storage positions to the predetermined operating positions using the single electric motor 41, and the reaction-force plates 20 and 30 can be held at the predetermined operating positions by at least one of the stoppers 15 and 16.

In the vehicle airbag system A1, because the reaction-force plates 20 and 30 can be moved within the area between the storage positions and the predetermined operating positions using the electric motor 41, the reaction-force plates 20 and 30 can be moved to given positions or returned to the storage positions by appropriately controlling the positive rotation or the reverse rotation of the electric motor 41 using the electric control unit ECU.

According to the first embodiment described above, when the vehicle crash sensor S1 detects a vehicle impact, electric power is supplied to the electric motor 41 such that the electric motor 41 rotates in the positive direction for the predetermined time before the electric power supply to the inflators 51 and 61. However, a pre-crash sensor S2, which determines the likelihood that a vehicle crash will occur, may be provided in addition to the vehicle crash sensor S1, and the pre-crash sensor S2 may be connected to the electric control unit ECU (see the portion surrounded by the two-dotted line in FIG. 12). For example, the electric control unit ECU may be configured to supply electric power to the electric motor 41 such that the electric motor 41 rotates in the positive direction for the predetermined time before a vehicle impact actually occurs, in accordance with the signal output from the pre-crash sensor S2.

In this case, the inflators 51 and 61 can be actuated immediately after a vehicle impact (or substantially simultaneously with a vehicle impact) by the electric control unit ECU in response to the signal output from the vehicle crash sensor S1. Accordingly, the airbags 52 and 62 can be deployed more quickly than in the embodiment described above.

In this case, when a vehicle crash can be avoided (when an actual vehicle impact is not detected by the vehicle crash sensor S1 although the pre-crash sensor S2 indicated a possible vehicle crash), the electric control unit ECU may supply electric power to the electric motor 41 such that the electric motor 41 rotates in the reverse direction for a predetermined time. In this case, the reaction-force plates 20 and 30 can be returned from the predetermined operating positions to the storage positions without actuating the airbag modules 50 and 60.

In the first embodiment described above, the upper reaction-force plate 20 and the lower reaction-force plate 30 are fitted to the instrument panel reinforcement 12 via hinge means including the left support bracket 13 and the right support bracket 14 such that the reaction-force plates 20 and 30 can pivot vertically. Also, the upper reaction-force plate 20 and the lower reaction-force plate 30 are connected to each other via the linkage means including the gears 21c and 31c and the gears 21d and 31d. However, as in a second embodiment shown in FIGS. 13 and 14, an upper reaction-force plate 120 may be fitted to an instrument panel reinforcement 112 such that the upper reaction-force plate 120 can pivot vertically. A lower reaction-force plate 130 may be fitted to a support bracket 113 of an instrument panel 111 via a support pin 114 such that the lower reaction-force plate 130 can pivot vertically. The upper reaction-force plate 120 and the lower reaction-force plate 130 may be connected to each other via linkage means including a link 119.

Figure 13:
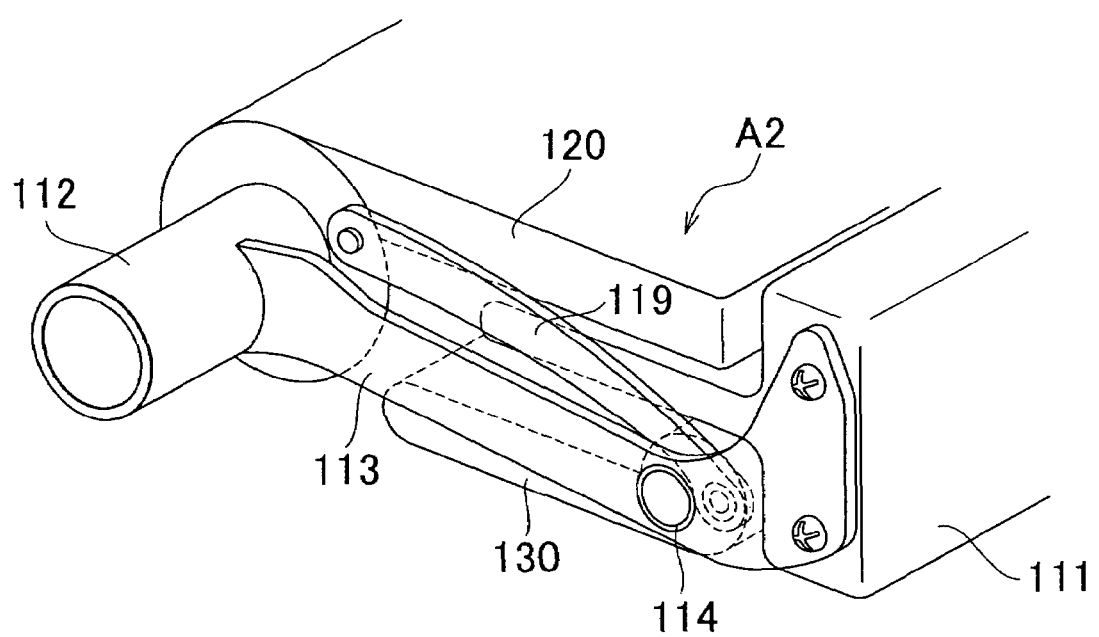
FIG. 13 illustrates the schematic perspective view of the main portion of a vehicle airbag system according to a second embodiment of the invention.
Figure 14:
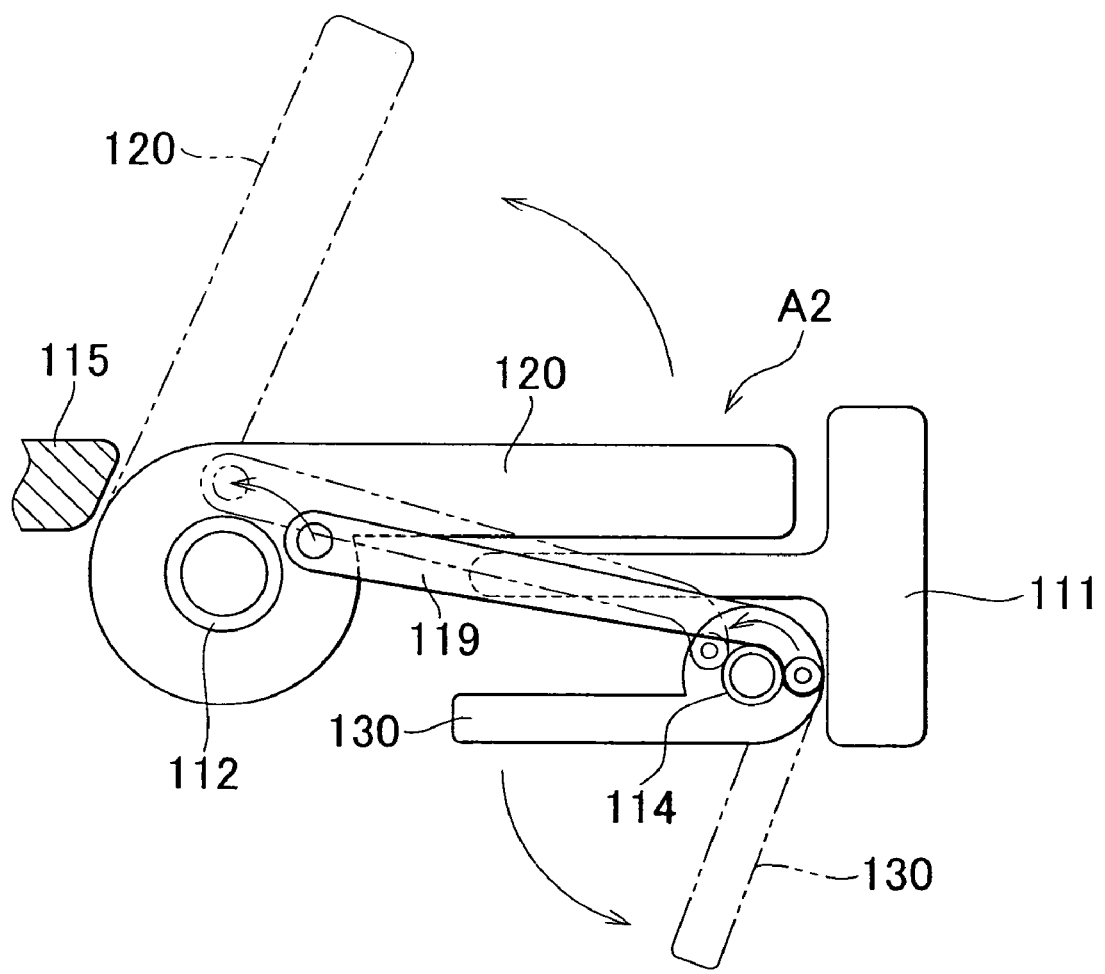
FIG. 14 illustrates the side view showing the relationship between two reaction-force plates, one of which is positioned above the other, and a link in FIG. 13.

The other configurations of the second embodiment shown in FIGS. 13 and 14 (a drive unit, an upper airbag module, a lower airbag module, an electric control unit, etc. (not shown)) are substantially the same as those of the first embodiment (the drive unit 40, the upper airbag module 50, the lower airbag module 60, the electric control unit ECU, etc.). Accordingly, the same configurations as those of the first embodiment are not described below. In the second embodiment, a single stopper 115 is employed, and the upper reaction-force plate 120 is held at a predetermined operating position by the stopper 115.

In a vehicle airbag system A2 according to the second embodiment, as the upper reaction-force plate 120 is moved from the storage position to the predetermined operating position by the drive unit, the lower reaction-force plate 130 is moved (pivoted) from the storage position to the predetermined operating position by the link 119. The upper reaction-force plate 120 is held at the predetermined operating position by the stopper 115, and the lower reaction-force plate 130, which is connected to the upper reaction-force plate 120 via the link 119, is held at the predetermined operating position.

In the vehicle airbag system A2 according to the second embodiment, the lower reaction-force plate 130 moves to the predetermined operating position by pivoting toward the rear of the vehicle. The pivot point of the lower reaction-force plate 130 is closer to the rear of the vehicle than the upper reaction-force plate 120 is. Accordingly, the position, at which the knee airbag (not shown) of the knee airbag module fitted to the lower reaction-force plate 130 starts to deploy, is closer to the front-seat occupant Pa than that in the first embodiment. Therefore, as compared to the first embodiment, the knee airbag having a smaller bag capacity and the smaller-sized inflator that deploys the airbag can be employed.

In the first embodiment described above, the upper reaction-force plate 20 houses the upper-body airbag module 50 including the inflator 51 and the upper-body airbag 52, and the lower reaction-force plate 30 houses the knee airbag module 60 including the inflator 61 and the knee airbag 62. However, as in a third embodiment shown in FIGS. 15 to 18, a single airbag 252 may be housed between an upper reaction-force plate 220 and a lower reaction-force plate 230, and an inflator 251 may be housed in a hollow instrument panel reinforcement 212.

As in the first embodiment and the second embodiment described above, when the airbag is formed of the separate upper-body airbag 52 and knee airbag 62, each of the airbags 52 and 62 can be set to have the optimum shape. Accordingly, the upper-body and knees of the front-seat occupant Pa can be protected in the optimum manner. Meanwhile, as in the third embodiment described above, when the airbag is formed of the single airbag 252 that functions as both the upper-body airbag and the knee airbag for the front-seat occupant Pa, the upper-body and the knees of the front-seat occupant Pa can be reliably protected by a vehicle airbag system A3 having a simple configuration.

Figure 15:
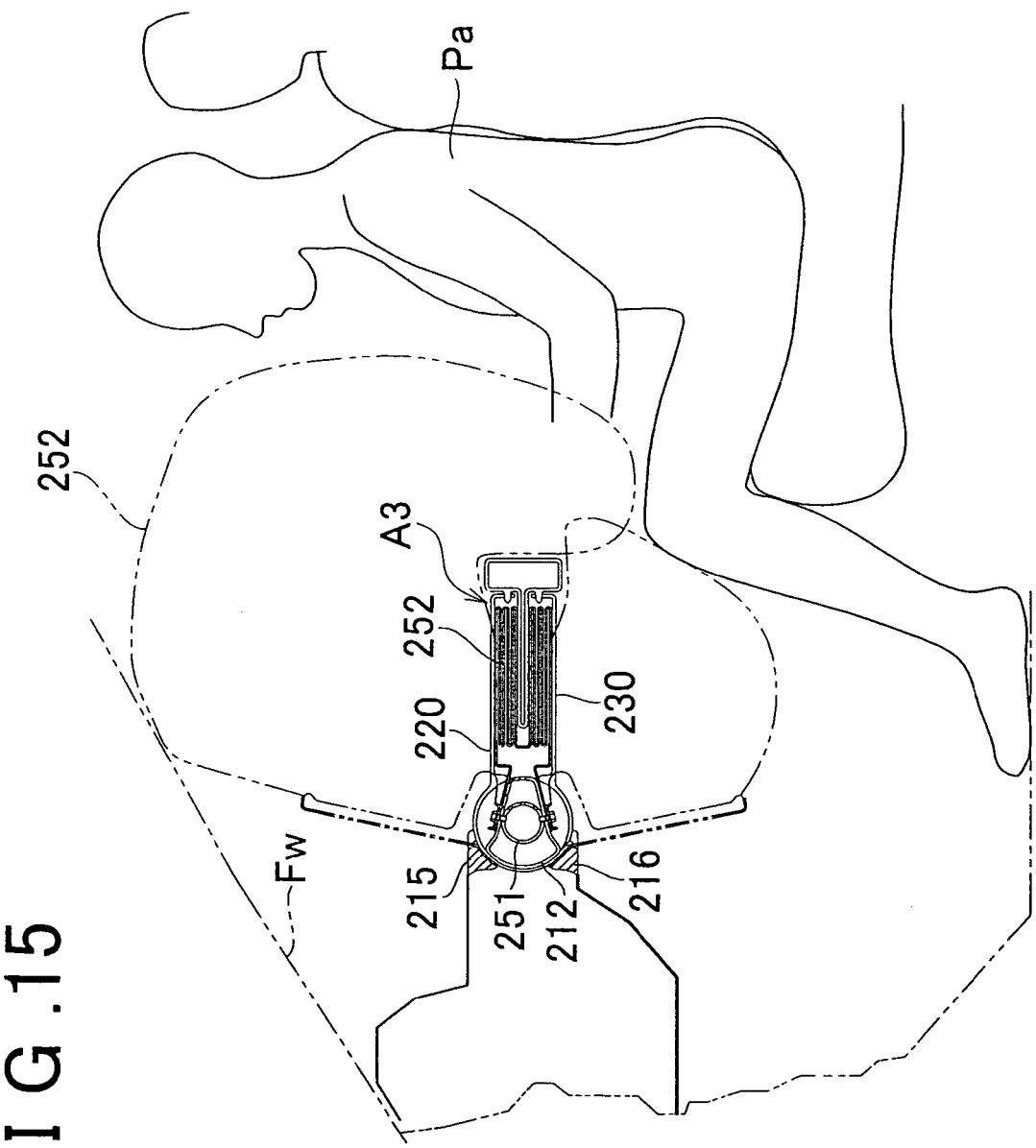
FIG. 15 illustrates the schematic vertical cross-sectional side view of a vehicle airbag system according to a third embodiment of the invention.
Figure 16:
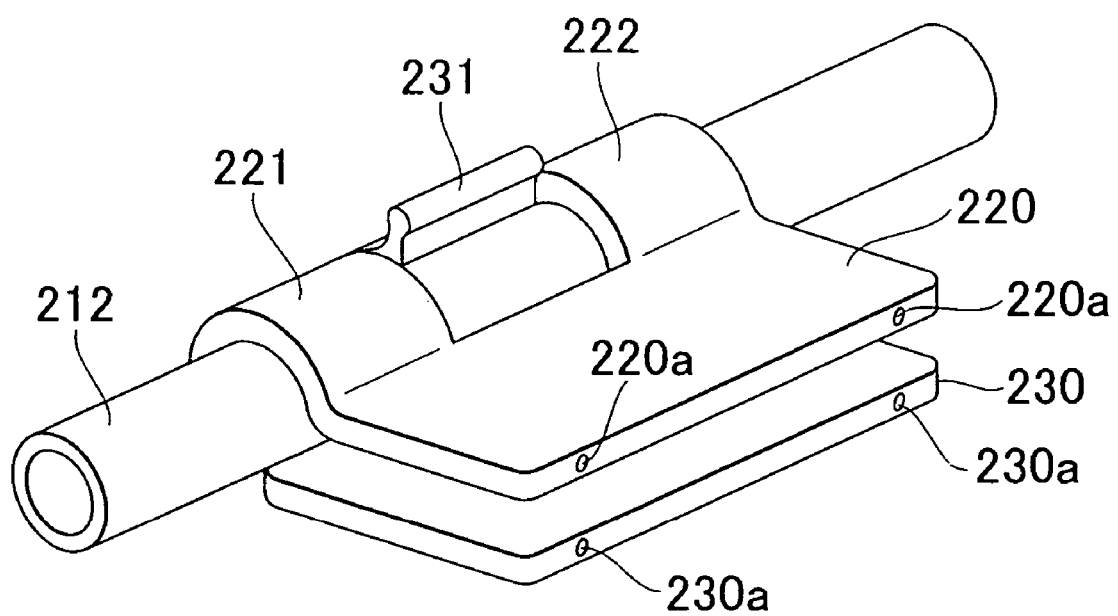
FIG. 16 illustrates the perspective view showing the relationship among an instrument panel reinforcement and two reaction-force plates, one of which is positioned above the other, of the vehicle airbag system in FIG. 15.
Figure 17:
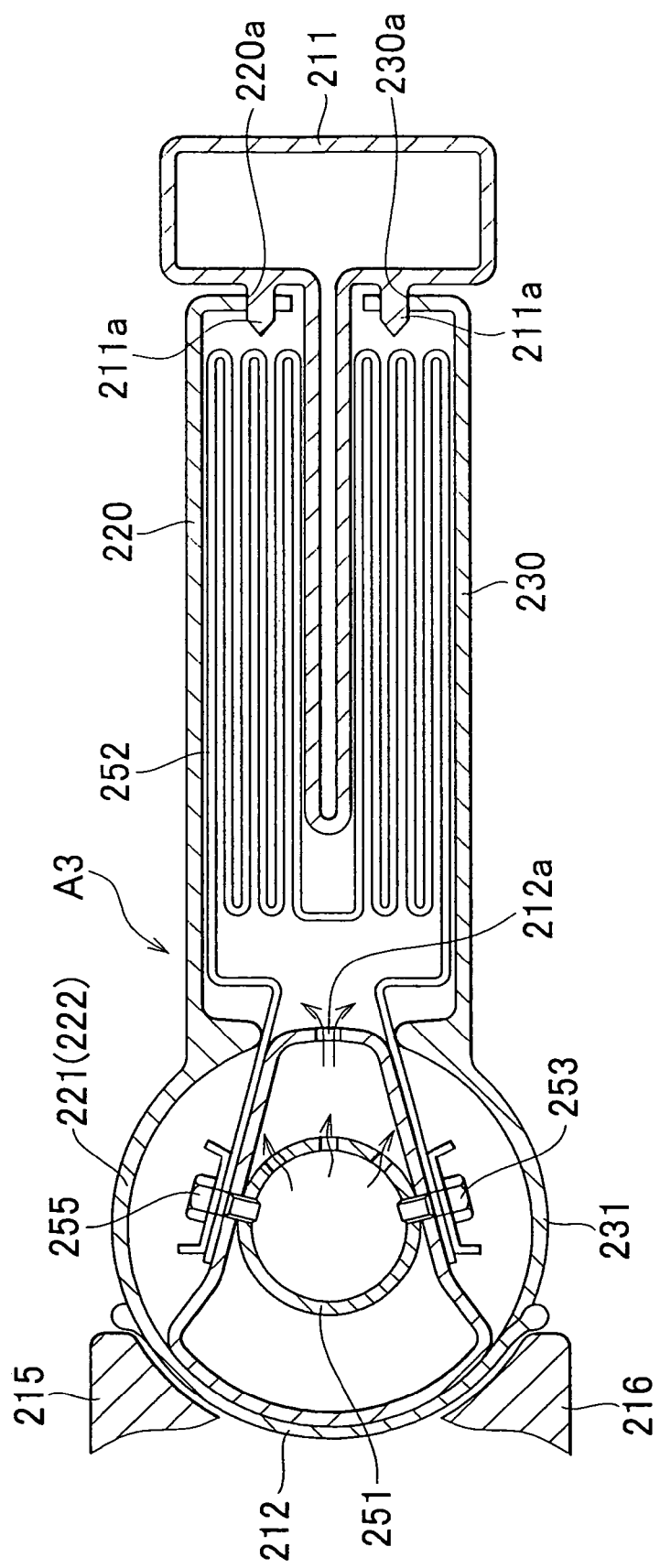
FIG. 17 illustrates the enlarged cross-sectional view of the main portion of the vehicle airbag system in FIG. 15.
Figure 18:
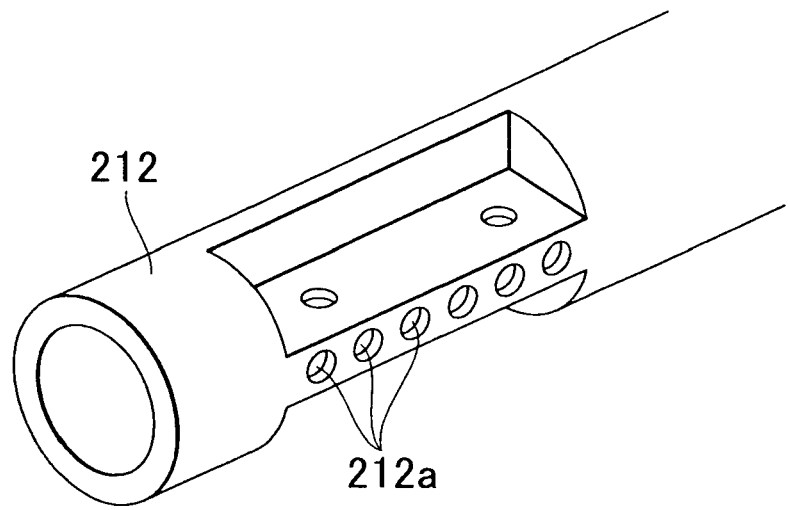
FIG. 18 illustrates the schematic perspective view of the instrument panel reinforcement of the vehicle airbag system in FIG. 15.
Figure 19:
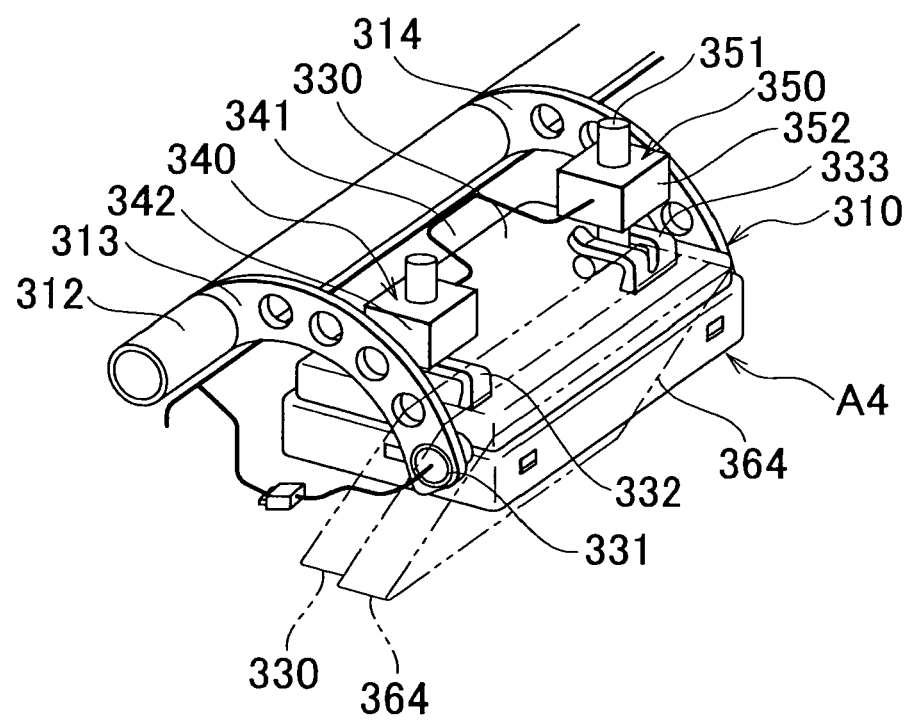
FIG. 19 illustrates the schematic perspective view of a vehicle airbag system according to a fourth embodiment of the invention.
Figure 21:
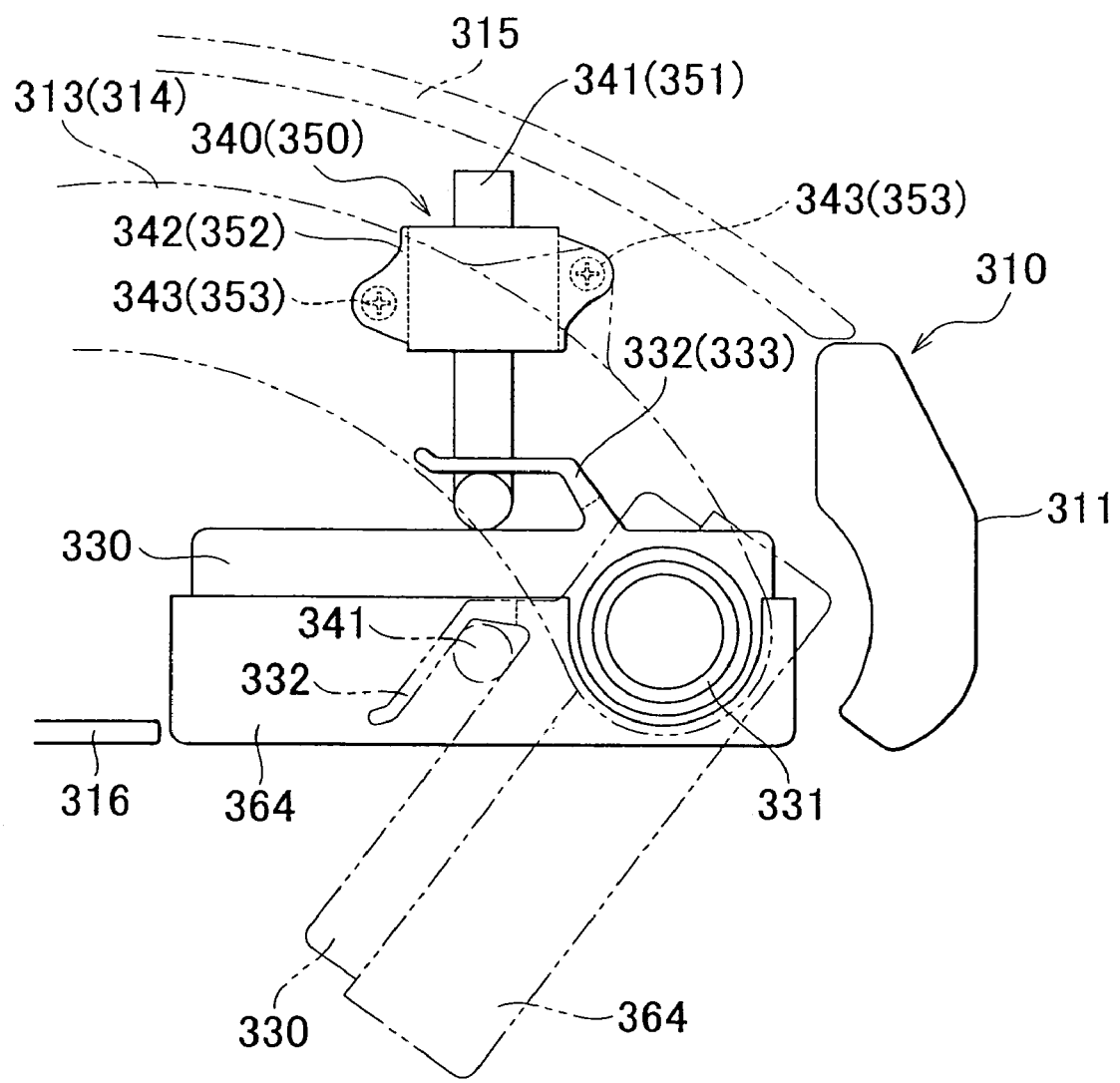
FIG. 21 illustrates the schematic left side view of the vehicle airbag system in FIG. 19.
Figure 22:
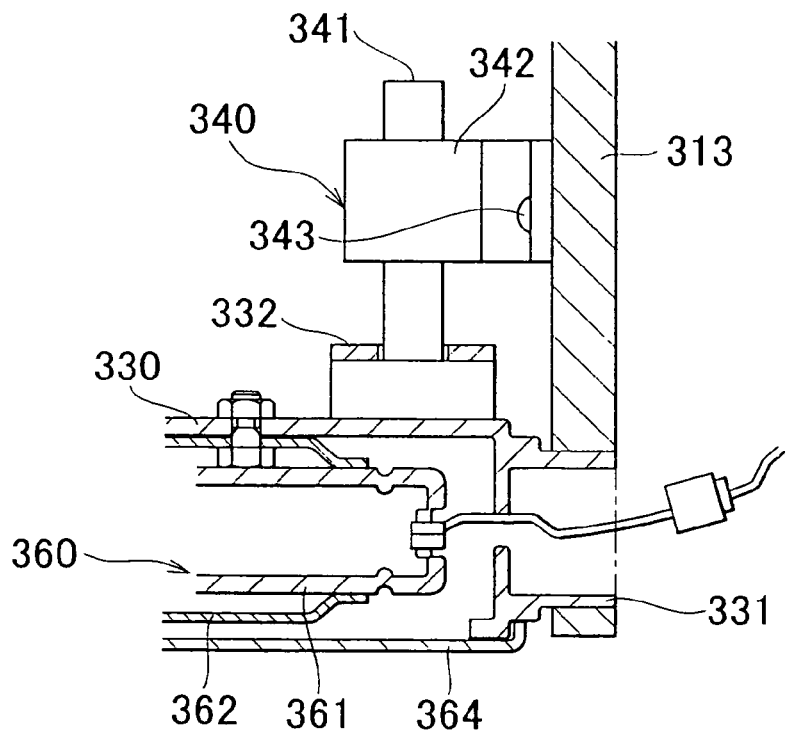
FIG. 22 illustrates the schematic cross-sectional front view showing the relationship between a left electromagnetic actuator and a reaction-force plate of the vehicle airbag system in FIG. 19.
Figure 23:
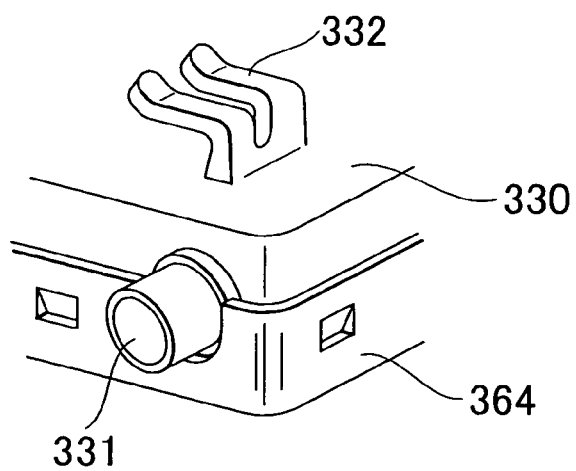
FIG. 23 illustrates the enlarged perspective view of the main portion of the reaction-force plate of the vehicle airbag system in FIG. 19.

In the vehicle airbag system A3 according to the third embodiment shown in FIGS. 15 to 18, the upper reaction-force plate 220 is fitted onto the instrument panel reinforcement 212 at a left hinge portions 221 and a right hinge portion 222 such that the upper reaction-force plate 220 can pivot vertically. Also, the lower reaction-force plate 230 is fitted onto the instrument panel reinforcement 212 at a center hinge portion 231 such that the lower reaction-force plate 230 can pivot vertically. As shown in FIGS. 16 and 17, fitting holes 220a and 230a, into which support pins 211a formed on the rear face of the instrument panel 211 are fitted, are formed in the rear end faces of the upper reaction-force plate 220 and the lower reaction-force plate 230, respectively. Also, in the vehicle airbag system A3, stoppers 215 and 216, which serve as holding means for holding the reaction-force plates 220 and 230 at the predetermined operating positions, are provided (see FIGS. 15 and 17).

As shown in FIGS. 15 and 17, the airbag 252 according to the third embodiment is the single airbag that serves as both an upper-body airbag and a knee airbag for the front-seat occupant Pa. The airbag 252 is air-tightly fitted to the instrument panel reinforcement 212 using multiple bolts 253. The inflator 251 is air-tightly fitted to the instrument panel reinforcement 212 using the above-mentioned multiple bolts 253. In the third embodiment, multiple gas-injection holes 212a are formed in the instrument panel reinforcement 212 such that the gas injected from the inflator 251 is supplied to the airbag 252 (see FIG. 18).

In the vehicle airbag system A3 according to the third embodiment, the support pins 211a and the fitting holes 220a and 230a are employed as supporting means for supporting the upper reaction-force plate 220 and the lower reaction-force plate 230 at the storage positions. The support pins 211a are removed from the fitting holes 220a and 230a due to a force that is greater than the supporting force obtained by fitting the support pins 211a into the fitting holes 220a and 230a, namely, due to a force obtained by deployment of the airbag 252. Also, the reaction-force plates 220 and 230 can move from the storage positions to the predetermined operating positions (the positions at which the reaction-force plates 220 and 230 contact the stoppers 215 and 216, respectively) due to the force obtained by deployment of the airbag 252. Therefore, the vehicle airbag system A3 according third embodiment is not provided with the drive unit 40 and the linkage means including the gears 21c and 31c and the gears 21d and 31d in the first embodiment.

In the embodiments described above (first to third embodiments), the invention is applied to the airbag systems A1 to A3 that can protect both the upper-body and the knees of the front-seat occupant Pa. However, as in a fourth embodiment shown in FIGS. 19 to 24, the invention may be applied to a vehicle airbag system A4 that can protect only the knees of the front-seat occupant.

The vehicle airbag system A4 according to the fourth embodiment includes the vehicle crash sensor S1 that detects a vehicle impact (see FIG. 24); a reaction-force plate 330 that is provided in interior equipment 310 positioned in front of the front-seat occupant; a left electromagnetic actuator 340; a right electromagnetic actuator 350; and a knee airbag module 360 fitted to the reaction-force plate 330 (see FIG. 20).

The interior equipment 310 includes an instrument panel 311 that is shallow and that is small-sized in the vertical direction; and an instrument panel reinforcement 312 that supports the instrument panel 311 via a left support bracket 313 and a right support bracket 314. The interior equipment 310 further includes an upper cover 315, and a lower cover 316. The upper cover 315 is fitted to the support brackets 313 and 314, and covers and protects, from above, the area of the interior equipment 310 on the front side of the upper end of the instrument panel 311. The lower cover 316 is fitted to the support brackets 313 and 314, and covers and supports, from below, the area of the interior equipment 310 on the front side of the lower end of the instrument panel 311, except the portion at which the reaction-force plate 330 is provided.

The front face of the instrument panel 311 faces the front-seat occupant and is a functional surface that configures the design thereof. The instrument panel 311 is fitted to the support brackets 313 and 314 at the rear face. The instrument panel reinforcement 312 is provided behind the instrument panel 311 such that the instrument panel reinforcement 312 is closer to the front of the vehicle than the instrument panel 311 is. The instrument panel reinforcement 312 is held and supported by the vehicle body (not shown) at the right and left end portions. The support brackets 313 and 134 are fixed to the instrument panel reinforcement 312 at the front ends, and extends from the instrument panel reinforcement 312 toward the rear of the vehicle.

The reaction-force plate 330 is an active knee protector that is driven by the electromagnetic actuators 340 and 350 and move toward the knees of the front-seat occupant. The reaction force plate 330 can house the knee airbag module 360. Right and left cylindrical shaft support portions 331 are formed at the base end portion (rear end portion) of the reaction-force plate 330. Also, a left support portion 332 and a right support portion 333 are formed at rear portion of the upper face of the reaction-force plate 330. The cylindrical shaft support portions 331 are fitted to the rear end portions of the support brackets 313 and 134 such that the reaction-force plate 330 can pivot vertically. The support portions 332 and 333 are fitted to the lower ends of rods 341 and 351 of the electromagnetic actuators 340 and 350, respectively.

Each of the electromagnetic actuators 340 and 350 serves as moving means for moving the reaction-force plate 330 from the storage position (the position indicated by the solid lines in FIGS. 19 and 21) to the predetermined operating position (the position indicated by the two-dotted lines in FIGS. 19 and 21), and holding means for holding the reaction-force plate 330 at the storage position or the predetermined operating position. The electromagnetic actuators 340 and 350 include the rods 341 and 351 that can move in the vertical direction by a predetermined amount; and electromagnetic solenoids 342 and 352 that can move the rods 341 and 351 in the vertical direction, and that can support the rods 341 and 351 at the upper end positions or the lower end positions at which the rods 341 and 351 have moved to the fullest extent, respectively. Each of the electromagnetic actuators 340 and 350 further includes a return spring (not shown) that returns the reaction-force plate 330 toward the storage position, when electric power supply to the electromagnetic solenoids 342 and 352 is interrupted.

Each of the rods 341 and 351 has a T-shape and the lower end thereof extends in the lateral direction. The rods 341 and 351 are fitted to the support portions 332 and 333 of the reaction-force plate 330 such that the rods 341 and 351 can move with respect to the support portions 332 and 333, respectively. The electromagnetic solenoids 342 and 352 are fitted to the support brackets 313 and 314 with two screws 343 and two screws 353, respectively (see FIGS. 21 and 22). Electric power supply to the electromagnetic solenoids 342 and 352 is controlled by the electric control unit ECU in accordance with the detection signal from the vehicle crash sensor S1.

As shown in FIG. 20, the knee airbag module 360 includes an inflator 361, and a knee airbag 362. The knee airbag module 360 is fitted to the reaction-force plate 330 via a holder 363. The inflator 361 is a known inflator that injects gas into the knee airbag 362. The inflator 361 is controlled by the electric control unit ECU in accordance with the signal output from the vehicle crash sensor S1.

The knee airbag 362 is a known airbag that is deployed using the gas injected from the inflator 361. The knee airbag 362 is housed inside of the reaction-force plate 330 when folded. The folded knee airbag 362 is covered and protected by a cover 364 that ruptures due to deployment of the airbag 362.

Figure 24:
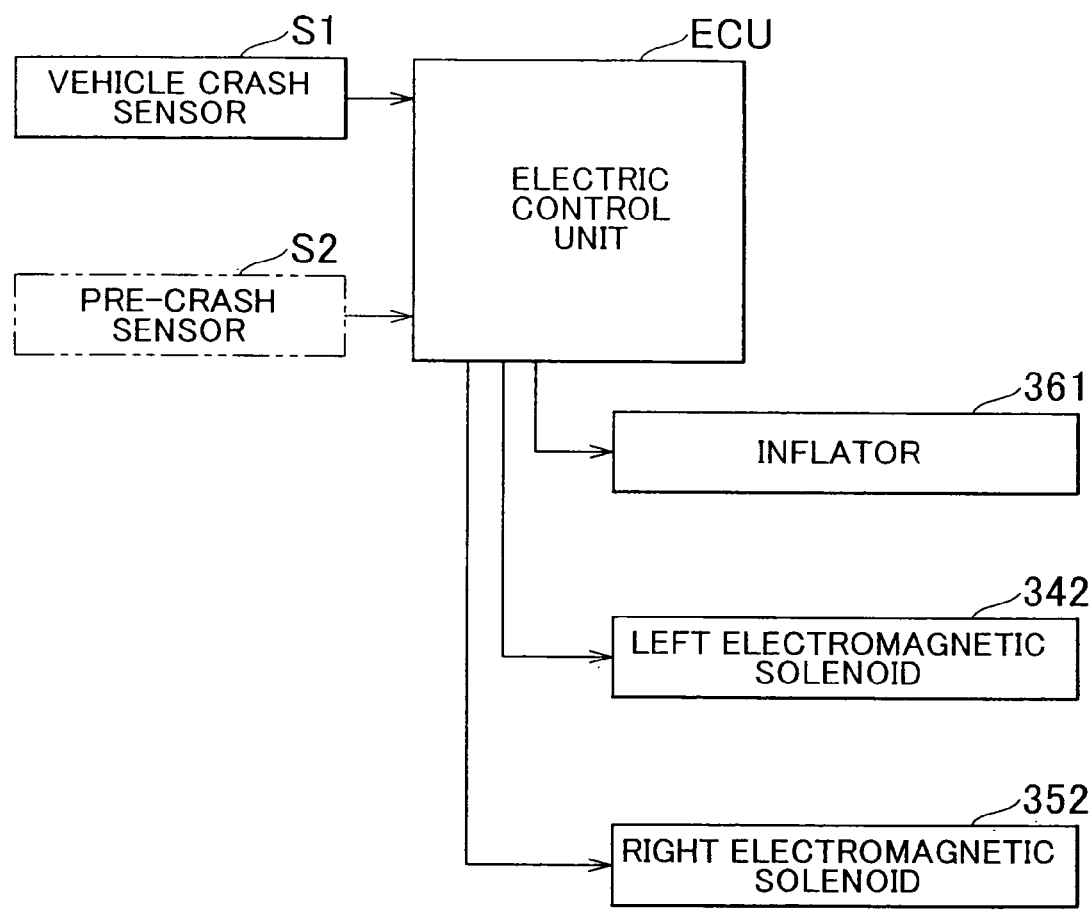
FIG. 24 schematically illustrates an electric circuit of the vehicle airbag system according to the fourth embodiment shown in FIGS. 19 to 23.

As shown in FIG. 24, the electric control unit ECU is connected to the vehicle crash sensor S1, the electromagnetic solenoid 342 of the electromagnetic actuator 340, the electromagnetic solenoid 352 of the electromagnetic actuator 350, and the inflator 361. Also, the electric control unit ECU is configured to supply electric power to the electromagnetic solenoids 342 and 352 such that the rods 341 and 351 of the electromagnetic actuators 340 and 350 move from the upper end positions to the lower end positions, respectively, before the electric power supply to the inflator 361, in accordance with the signal output from the vehicle crash sensor S1, when a vehicle impact is detected by the vehicle crash sensor S1.

Thus, when a vehicle impact is detected, the reaction-force plate 330 can be moved, in advance, from the storage position to the predetermined operating position by the actuation of the electromagnetic actuators 340 and 350 due to electric power supply thereto (downward movement of the rods 341 and 351), before deployment of the airbag 362. Electric power supply to the electromagnetic actuators 340 and 350 is maintained by the electric control unit ECU until the knee airbag 362 is deployed due to electric power supply to the inflator 361 such that the rods 341 and 351 of the electromagnetic actuators 340 and 350 are held at the lower end positions, respectively. Thus, when the knee airbag 362 is deployed, the reaction-force plate 330 can be held at the predetermined operating position.

In the vehicle airbag system A4 thus configured according to the fourth embodiment, the reaction-force plate 330 can be moved, in advance, from the storage position to the predetermined operating position by the actuation of the electromagnetic actuators 340 and 350 due to electric power supply thereto, before deployment of the knee airbag 362. The reaction-force plate 330 that has moved to the predetermined operating position is held at the operating position because electric power supply to the electromagnetic actuators 340 and 350 is maintained. Thus, the knee airbag 362 can be appropriately deployed, and the front-seat occupant can be reliably protected.

In the vehicle airbag system A4, even if the thin (vertically small-sized) instrument panel 311 is employed as an instrument panel, the operating position of the reaction-force plate 330 held by the rods 341 and 351 (the predetermined operating position defined by the rods 341 and 351) can be appropriately set by appropriately setting the lower end positions of the rods 341 and 351 of the electromagnetic actuators 340 and 350. Thus, the angle of the reaction-force plate 330, at the operating position, with respect to the knees of the front-seat occupant can be appropriately set.

Thus, in the vehicle airbag system A4, the knee airbag 362 for the front-seat occupant, having a smaller bag capacity, and the smaller-sized inflator 361 can be employed. Also, in the vehicle airbag system A4, because the deployed knee airbag 362 is supported by the reaction-force plate 330 at the predetermined operating position, the reaction force of the deployed knee airbag 362 can be obtained more easily.

In the vehicle airbag system A4, the reaction-force plate 330 can be moved within the region between the storage position and the predetermined operating position by the electromagnetic actuators 340 and 350. Accordingly, the reaction-force plate 330 can be moved from the storage position to the predetermined operating position or from the predetermined operating position to the storage position by appropriately controlling permission/interruption of electric power supply to the electromagnetic actuators 340 and 350.

In the vehicle airbag system A4 as well, in addition to the vehicle crash sensor S1, the pre-crash sensor S2, which determines the likelihood that a vehicle crash will occur, may be provided and connected to the electric control unit ECU (see the two-dotted line in FIG. 24). For example, electric power supply to the electromagnetic actuators 340 and 350 may be maintained by the electric control unit ECU before a vehicle impact, in accordance with the signal output from the pre-crash sensor S2.

In this case, in accordance with the signal output from the vehicle crash sensor S1, the inflator 361 can be actuated immediately after a vehicle impact (or substantially simultaneously with a vehicle impact) by the electric control unit ECU. Accordingly, the knee airbag 362 can be deployed more quickly in comparison with the embodiments described above.

In this case, when a vehicle crash is avoided (when a vehicle impact is not detected by the vehicle crash sensor S1 although a possible vehicle crash is predicted by the pre-crash sensor S2), electric power supply to the electromagnetic actuators 340 and 350 may be interrupted by the electric control unit ECU. In this case, the reaction-force plate 330 can be returned from the predetermined operating position to the storage position by the return spring (not shown) without activating the airbag module 360.

What is claimed is:

1. A vehicle airbag system comprising:
    a vehicle crash sensor that detects a vehicle impact;
    an airbag module that is provided in interior equipment positioned in front of at least a front-seat occupant and that includes an inflator and an airbag, wherein, when the vehicle crash sensor detects a vehicle impact, the airbag is deployed by activating the inflator in order to protect the front-seal occupant;
    at least two reaction-force plates, each of the reaction-force plates comprising at least one face, wherein each at least one face receives a reaction force of the airbag when the airbag is deployed and after the airbag has been deployed;
    a moving device that moves the reaction-force plates from a storage position to a predetermined operating position; and
    a holding device that holds the reaction-force plates at the predetermined operating position,
    wherein at a predetermined time, the reaction-force plates can be moved from the storage position to the predetermined operating position by the moving device, at which position each of the at least one face of the reaction-force plates receives the reaction force of the airbag.

2. The vehicle airbag system according to claim 1, wherein the reaction-force plates can move from the storage position to the predetermined operating position, when the airbag is deployed.

3. The vehicle airbag system according to claim 2, wherein:
    the airbag is forced of at least one of an upper-body airbag and a knee airbag for the front-seat occupant;
    the reaction-force plates are supported at the storage position by a supporting device; and
    the moving device is the airbag that is deployed by a force greater than a supporting force of the supporting device.

4. The vehicle airbag system according to claim 1, wherein:
    the reaction-force plates are active reaction-force plates;
    the moving device is an actuator; and
    the active reaction-force plates can be moved, in advance, from the storage position to the predetermined operating position by the actuator before the airbag is deployed.

5. The vehicle airbag system according to claim 4, further comprising:
    a pre-crash sensor that determines a likelihood that a vehicle crash will occur,
    wherein the actuator is actuated in response to a signal output from the pre-crash sensor such that the active reaction-force plates can move from the storage position to the predetermined operating position.

6. The vehicle airbag system according to claim 5, wherein the active reaction-force plates move from the predetermined operating position to the storage position when an actual vehicle impact is not detected by the vehicle crash sensor although the pre-crash sensor indicated a possible vehicle crash.

7. The vehicle airbag system according to claim 4, wherein:
    the airbag is a knee airbag for the front-seat occupant; and
    the active reaction-force plates are an active knee protector that can move toward knees of the front-seat occupant.

8. The vehicle airbag system according to claim 1, wherein the reaction-force plates are fitted to an instrument panel reinforcement via a hinge such that the reaction-force plates can pivot vertically.

9. The vehicle airbag system according to claim 8, wherein the instrument panel reinforcement has a hollow portion, houses the inflator in the hollow portion, and has a gas injection hole through which gas is injected from the inflator into the airbag.

10. The vehicle airbag system according to claim 1, wherein the airbag is formed of an upper-body airbag and a knee airbag for the front-seat occupant, which are separate from each other.

11. The vehicle airbag system according to claim 1, wherein the airbag is a single airbag that serves as both an upper-body airbag and a knee airbag for the front-seat occupant.

12. The vehicle airbag system according to claim 1, wherein:
the reaction-force plates are formed of an upper reaction-force plate and a lower reaction-force plate that are connected to each other via a linkage device; and,
as the upper reaction-force plate moves upward, the lower reaction-force plate can move downward.

13. The vehicle airbag system according to claim 12, wherein the linkage device is a pair of gears that are provided on the upper reaction-force plate and the lower reaction-force plate, and that mesh each other.

14. The vehicle airbag system according to claim 12, wherein the linkage device is a link that connects the upper reaction-force plate with the lower reaction-force plate.

15. The vehicle airbag system according to claim 1, wherein the moving device includes an electric motor and a drive gear.

16. The vehicle airing system according to claim 1, wherein the moving device includes an electromagnetic solenoid.

17. The vehicle airbag system according to claim 1, wherein the airbag is covered and protected by a cover that ruptures due to deployment of the airbag.

18. A vehicle airbag system comprising:
a vehicle crash sensor that detects a vehicle impact;
an airbag module that is provided in interior equipment positioned in front of at least a front-seat occupant and that includes an inflator and an airbag, wherein, when the vehicle crash sensor detects a vehicle impact, the airbag is deployed by activating the inflator in order to protect the front-seat occupant;
at least two reaction-force plates, each of the reaction-force comprising at least one face, wherein each at least one face receives a reaction force of the airbag when the airbag is deployed and after the airbag has been deployed;
moving means for moving the reaction-force plates from a storage position to a predetermined operating position; and
holding means for holding the reaction-force plates at the predetermined operating position,
wherein at a predetermined time, the reaction-force plates can be moved from the storage position to the predetermined operating position by the moving means, at which position each of the at least one face of the reaction-force plates receives the reaction force of the airbag.

19. A vehicle airbag system comprising:
a vehicle crash sensor that detects a vehicle impact;
an airing module that is provided in interior equipment positioned in front of at least a front-seat occupant and that includes an inflator and an airbag, wherein, when the vehicle crash sensor detects a vehicle impact, the airbag is deployed by activating the inflator in order to protect the front-seat occupant;
at least two active reaction-force plates, each of the reaction-force plates comprising at least one face, wherein each at least one face receives a reaction force of the airbag after the airbag has been deployed;
an actuator that moves the reaction-force plates from a storage position to a predetermined operating position;
holding means for holding the reaction-force plates at the predetermined operating position; and
a pre-crash sensor that determines a likelihood that a vehicle crash will occur,
wherein the actuator is actuated in response to a signal output from the pre-crash sensor such that the active reaction-force plates can move from the storage position to the predetermined operating position, at which position each of the at least one face of the reaction-force plates receives the reaction force of the airbag.

* * * * *